(No Model.)

F. W. DAVENPORT.
RULING PEN CLEANER.

No. 465,521.             Patented Dec. 22, 1891.

Witnesses
Harmon S. Babcock
Samuel W. Fink

Inventor
Frank W. Davenport

UNITED STATES PATENT OFFICE.

FRANK W. DAVENPORT, OF PROVIDENCE, RHODE ISLAND.

RULING-PEN CLEANER.

SPECIFICATION forming part of Letters Patent No. 465,521, dated December 22, 1891.

Application filed October 28, 1891. Serial No. 410,061. (No model.)

*To all whom it may concern:*

Be it known that I, FRANK W. DAVENPORT, of the city and county of Providence, State of Rhode Island, have invented certain new and useful Improvements in Ruling-Pen Cleaners; and I declare the following to be a full, clear, and exact description of the same, reference being had to the accompanying drawings, forming part of this specification.

The object of this invention is to provide a ready means for cleaning the ink from ruling-pens, which from their peculiar construction are somewhat difficult to clean quickly. I attain my object by providing a cleaner with thin absorbent plates or webs which can be readily passed between the points of the pen.

Figure 1:
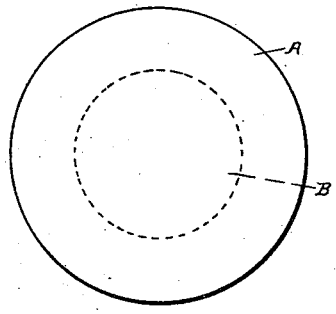
Figure 2:
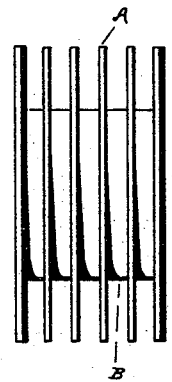

Referring to the drawings, Figure 1 is a top view, and Fig. 2 an edge view, of my invention.

A are thin plates or webs of absorbent material, such as blotting-paper, leather, &c. B are similar plates of smaller size, either of absorbent or any other material. The large and small plates are made to alternate with each other, and all are secured together, preferably, by a wire passing through their centers. When thus arranged, a certain portion of all the large plates from their edges back can be freely reached and passed between the points of the ruling-pen for the purpose of absorbing and brushing the ink therefrom.

It will be particularly observed that each of the operative absorbent plates have certain portions which are wholly separated from the adjoining plates, leaving well-defined spaces at both sides of the plates, thus enabling portions of each plate to be readily inserted between the points of the ruling-pen.

The plates shown in Figs. 1 and 2 are in the form of disks. Of course they may be given any form and need not necessarily consist of several separate pieces fastened together, but may be of one piece formed with the necessary projecting parts, to be used as before described.

Having fully described my invention, I do not confine myself to these particular forms or methods of construction, but claim—

1. A ruling-pen cleaner having thin plates or webs of absorbent animal or vegetable substance, in combination with means for holding them in proximity to each other, yet so arranged that the whole or certain portions of each plate shall be wholly and positively separated from the other plates, leaving a definite space between them.

2. A ruling-pen cleaner composed of alternate large and small plates held together side by side, the large plates made from thin absorbent animal or vegetable substance.

FRANK W. DAVENPORT.

Witnesses:
DANIEL W. FINK,
HARMON S. BABCOCK.